United States Patent
Rabu et al.

(10) Patent No.: US 8,872,798 B2
(45) Date of Patent: Oct. 28, 2014

(54) METHOD AND APPARATUS FOR RECEIVING USER INPUTS

(75) Inventors: Stanley Rabu, Sunnyvale, CA (US); Ching Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 13/251,007

(22) Filed: Sep. 30, 2011

(65) Prior Publication Data

US 2013/0082979 A1   Apr. 4, 2013

(51) Int. Cl.
  *G06F 3/042* (2006.01)
  *G06F 3/041* (2006.01)

(52) U.S. Cl.
  CPC .................... *G06F 3/0414* (2013.01)
  USPC .......................... 345/175; 345/173

(58) Field of Classification Search
  USPC ................................. 345/173, 175
  See application file for complete search history.

(56) References Cited

U.S. PATENT DOCUMENTS

| | | | |
|---|---|---|---|
| 2007/0296691 A1* | 12/2007 | Sampsell | 345/108 |
| 2008/0206521 A1* | 8/2008 | Hosaka | 428/172 |
| 2009/0001855 A1* | 1/2009 | Lipton et al. | 310/331 |
| 2011/0074731 A1* | 3/2011 | Inoue et al. | 345/174 |
| 2011/0227872 A1* | 9/2011 | Huska et al. | 345/174 |
| 2012/0075241 A1* | 3/2012 | Bao et al. | 345/174 |
| 2014/0009440 A1* | 1/2014 | Ferren et al. | 345/174 |

* cited by examiner

*Primary Examiner* — Joe H Cheng
*Assistant Examiner* — Michael J Jansen, II
(74) *Attorney, Agent, or Firm* — Brownstein Hyatt Farber Schreck, LLP

(57) ABSTRACT

Methods and apparatus for processing user events are provided. In particular, one or more sensor modules and processor modules are provided that can be operated to detect user events, such as the pressing of an otherwise mechanical switch. In many electronic devices, touch display screens are provided to the user for interfacing with the device. These displays often must also include one or more mechanical switches to provide necessary functionality. The functionality, however, comes at the cost of reduced aesthetics, and potentially increased manufacturing costs related to fabricating one or more holes in the display substrate. The sensor module disclosed herein can be configured such that collected pressure data can be focused, such as linear expansion data or deflection data. By collecting two different types of focused data, the apparatus can more accurately determine whether a user event has occurred. Additional types of sensors may also be utilized to provide even more reliable results.

16 Claims, 7 Drawing Sheets

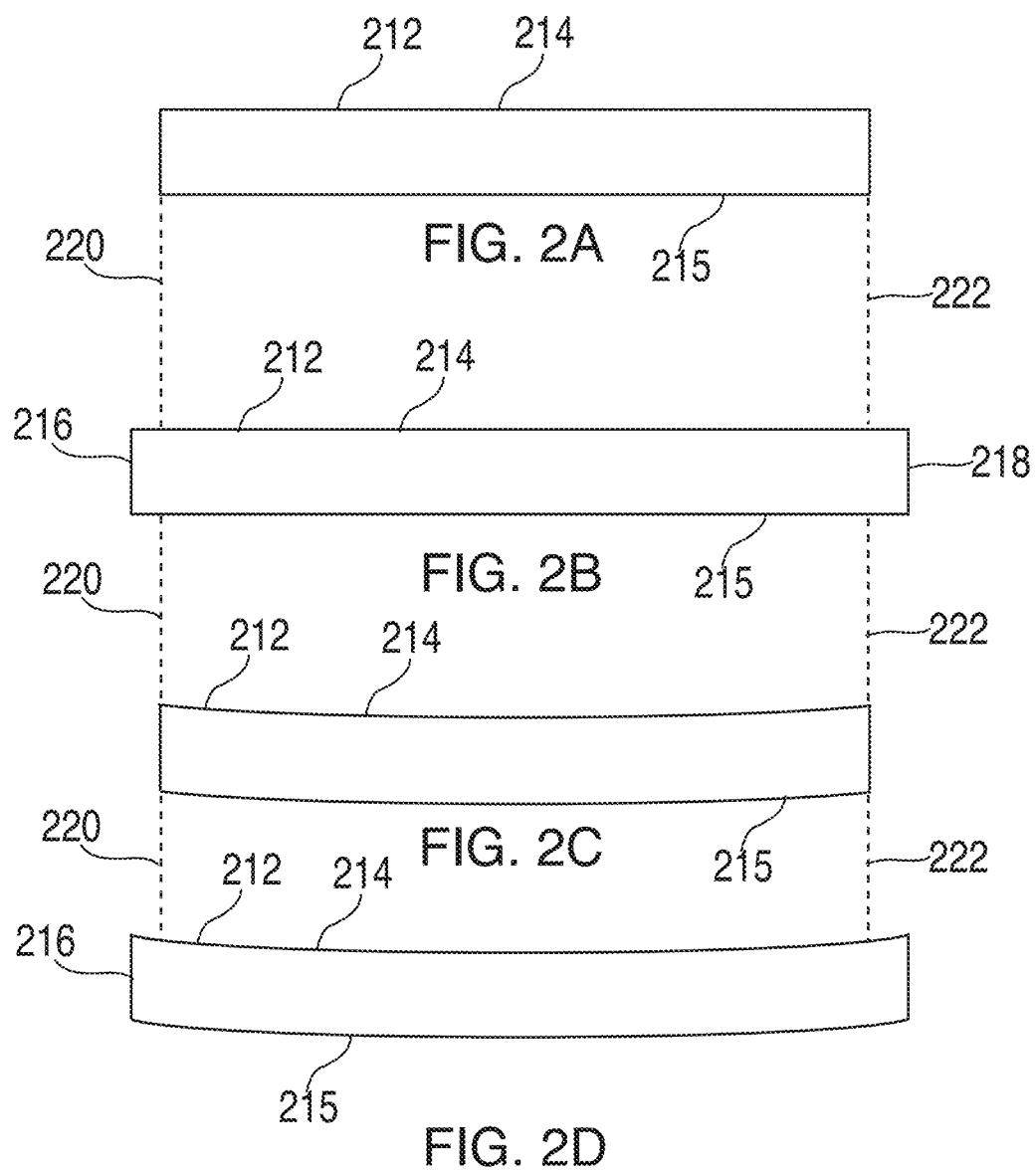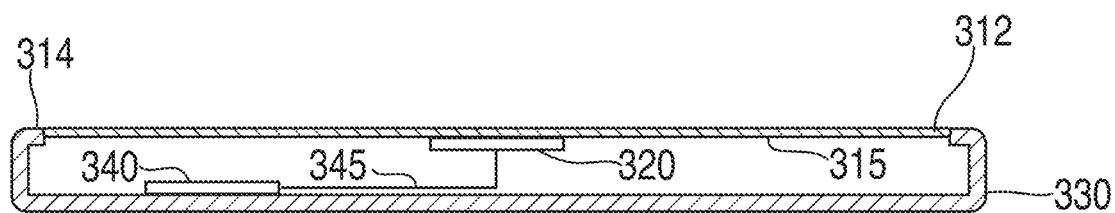

METHOD AND APPARATUS FOR RECEIVING USER INPUTS

BACKGROUND

Many electronic devices such as portable media players, smart phones, laptops, and monitors have one or more mechanical buttons that can be actuated by a user. The general nature of the design and implementation of mechanical buttons is such that those buttons need an external surface that the user interacts with and a separate and discreet structure within the electronic device so that the buttons can be depressed. This discreet structure can disrupt the cosmetic appeal of the electronic device and require additional manufacturing processing. For example, some portable electronic devices utilize a touch screen display that includes a mechanical switch. Many of these touch screens are formed from glass or plastic, so that they can be used as a display as well as a touch input device. In order to place a mechanical switch within the touch display, the glass or plastic needs to be processed to accommodate the space required for the switch. This processing could, for example, include drilling a hole in the glass and any subsequent processing to remove any sharp edges, etc. In any event, the addition of a hole in the glass for the mechanical switch detracts from the cosmetic appeal that a completely uniform surface would provide. That whole also provides a potential avenue for contaminants, such as a grain of sand, to potentially interfere with the proper functioning of the switch. Accordingly, what is needed are "soft" buttons that can be implemented using the touch surface itself, such that the cosmetic appeal of the electronic device is enhanced and manufacturing processing can be reduced.

SUMMARY

This is directed to electronic devices that include "soft" buttons or switches. "Soft" buttons or switches are switches that are inherently non-mechanical, in that they do not utilize a mechanical mechanism to switch from one state to another, but that still include one or more specific physical elements dedicated to the switch's operation. As such, this does not include items that are essentially entirely user-interface based, such as selections in a dialog box or other user interface that may pop up on a touch screen in response to a user's action.

In particular, this is directed to switches that include physical, dedicated sensors to determine whether a user is depressing or actuating the switch. These sensors can include, for example, micro-electro-mechanical systems (MEMS) devices that are capable of determining directional expansion of a surface. This can include linear expansion, curvature expansion or both. By analyzing the type and magnitude of the expansion of the surface, it can be determined when a user is attempting to actuate the switch.

The sensors can, for example, be located on the underside of a piece of glass that may also be utilized as a touch display. A graphic or indicia of a button may be applied to the specific region of the glass where the "soft" switch is located. In this manner, the glass does not require a specific opening for mechanical operation of the switch and the overall cosmetic appeal of the touch glass is increased. When the user presses on the "soft" button, the sensors are capable of detecting physical changes in the region of the glass where the user applied pressure. These physical changes are analyzed to determine whether the changes are the result of the user pushing the "soft" button or from some other incidental contact with the device. If it is determined that the user has depressed the "soft" button, the device then operates just as if the user had pressed a mechanical switch.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 2A-2D show a substrate that may be utilized in accordance with at least one embodiment of the invention;

FIG. 3 shows an illustrative side view of a "soft" switch constructed in accordance with at least one embodiment of the invention;

DETAILED DESCRIPTION OF THE DISCLOSURE

Figure 1:
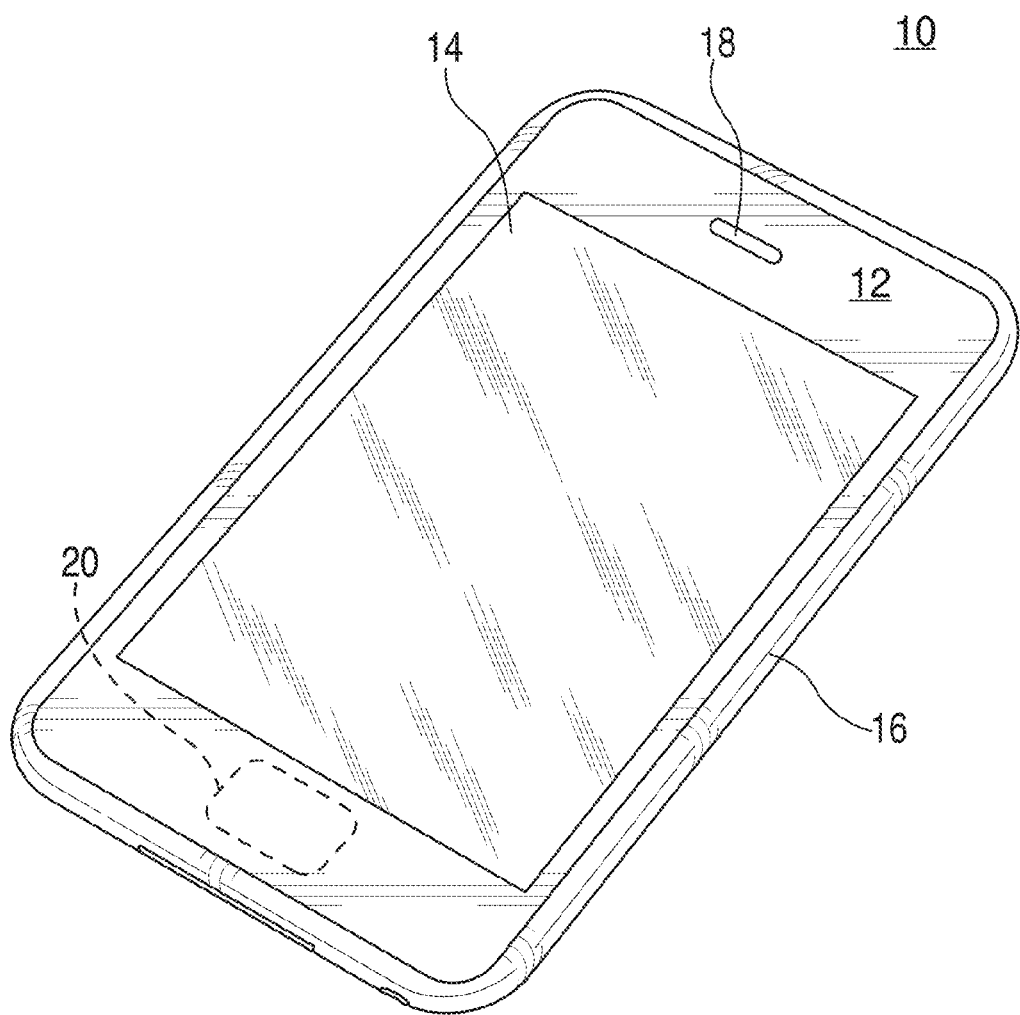
FIG. 1 is a three-dimensional perspective view of an electronic device constructed in accordance with at least one embodiment of the invention.

FIG. 1 shows an illustrative view of an electronic device 10 having a micro-electro-mechanical system (MEMS) sensor module according to at least one embodiment of the invention. Electronic device 10 can include substrate 12, having a top surface 14 and a bottom surface (not shown in FIG. 1), which can be secured to housing 16. Substrate 12 can be constructed from any suitable material such as glass, metal, plastic, or any combination thereof. Substrate 12 may have one or more ports 18 and soft button graphic or indicia 20 disposed on or etched into the surface of substrate 12. Soft button indicia 20 indicates a region on substrate 12 where the user can apply a finger or an object thereto to commence a user input event.

The user input event is effectively the same thing that occurs when a user depresses a mechanical button or switch on a conventional electronic device. In this instance, however, there is no mechanical button for the user to depress. Indicia 20 is located in a position to guide the user to the proper place on substrate 12 to actuate the "soft" button. When indicia 20 is depressed by the user, a sensor module (not shown in FIG. 1) that is mounted to bottom of substrate 12, and in particular, directly beneath indicia 20, detects the depression and collects data based on the depression that can be utilized to verify that an actual depression of the "soft" button has actually occurred.

FIGS. 2A-D show substrate 212 (substrate 212 may be, for example, the same as substrate 12 of FIG. 1) as it may exist in any one of four different states, depending on which forces, if any, are being applied to substrate 212. Substrate 212 includes top surface 214 (similar to top surface 14 of FIG. 1) and bottom surface 215, which are substantially co-planer with each other. Top surface 212 and bottom surface 214 remain substantially co-planar during linear expansion, but not during deflection. In particular, FIG. 2A shows substrate 212 in a no-load state. In the no-load state, no vertical or horizontal loads are applied to substrate 212, which is, therefore, not subject to any linear expansion or deflection.

FIG. 2B shows substrate 212 in a linearly-loaded state. In a linearly-loaded state (i.e., where there is substantially no deflection), substrate 210 either expands or contracts in a direction that is co-planar to top and bottom surfaces 214 and 215, respectively. As shown, the edges 216 and 218 of substrate 212 have expanded beyond the edges 220 and 222 of substrate 212 in the no-load state (as shown in FIG. 2A). Substrate 212 can expand or contract under various different circumstances. For example, substrate 212 can expand when exposed to heat. This might occur, for example, as the result of the application of a user's finger to an indicia located on top surface 214 (which would thereby impart heat into substrate 212), which would then expand linearly. Similarly, substrate 212 would contract linearly when heat is removed from substrate 212.

FIG. 2C shows substrate 212 in a deflection loaded state (i.e., where there is substantially no linear movement). In a deflection-loaded state, substrate 212 is subjected to pressure applied to top surface 214 of substrate 212. The deflection may be at an angle between about 0.1 degrees and 90 degrees relative to the plane of top surface 214, but in many instances will not be recognizable by the average user. The vertical pressure, however, can cause substrate 212 to bow, deflect, curve, or deform in response to the applied vertical pressure (even if such movement may not be apparent to the user).

FIG. 2D shows substrate 212 which it is loaded in both linear and deflected states. This fully-loaded state can occur, for example, when heat is being imparted to or removed from substrate 212 at the same time as a vertical force is being applied. In this situation, edges 216 and 218 expand linearly beyond the normal limits 220 and 220 of substrate 212, while also being deflected downward from top surface 214 toward bottom surface 215.

FIG. 3 shows an illustrative side view of substrate 312, having top surface 314 and bottom surface 315, with sensor module 320 mounted to bottom surface 315. Sensor 320 may be mounted directly to bottom surface 315 of substrate 312 in a location that is substantially directly below the indicia described above with respect to FIG. 1 (e.g., at a location at or about where a conventional mechanical switch might be located). Sensor module 320 can be a single die bonded to bottom surface 315 or it may have a bonded land pattern for being mounted to bottom surface 315. A substantially direct interface between substrate 312 and sensor module 320 will enable sensor module 320 to monitor both linear and deflection loads that may be imposed on substrate 312. If desired, sensor module 320 can include other features, such as the ability to monitor other variables such as temperature and motion.

Substrate 312 can be mounted to housing 330 in a manner such that bottom surface 315 and sensor module 320 would be located within housing 330. A processing module 340, also located within housing 330, is coupled to sensor module 320 via interface 345 such that processing module 340 can receive and process linear expansion and deflection data collected by sensor module 320. As set forth in more detail below, processing module 340 can process data received from sensor module 320 in order to determine when the "soft" button at the indicia (shown in FIG. 1) has been depressed by a user.

Figure 4:
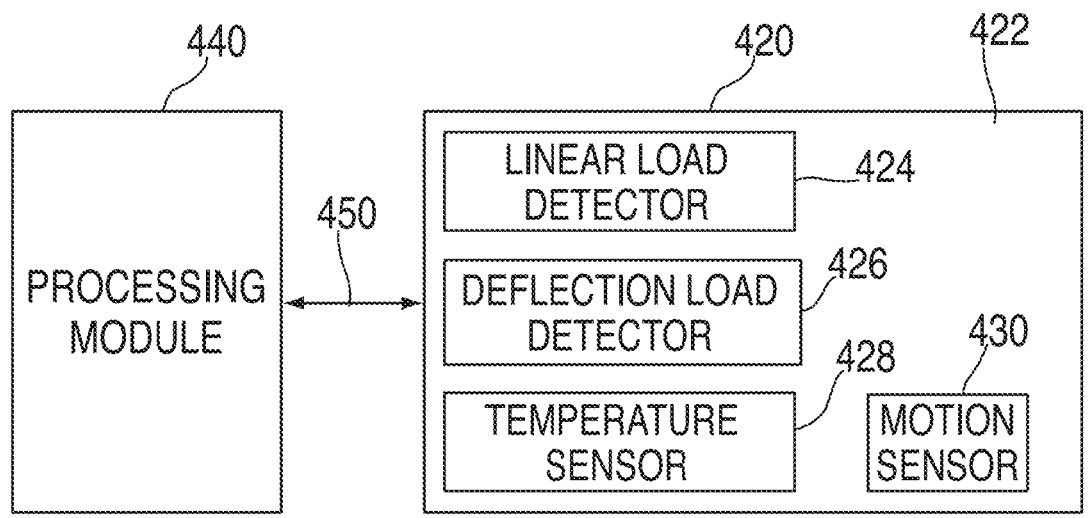
FIG. 4 shows a schematic diagram of sensor and processing modules constructed in accordance with at least one embodiment of the invention.

FIG. 4 shows an illustrative schematic of sensor and processing modules, which can be utilized in accordance with at least one embodiment. Sensor module 420, for example, may be utilized in the same manner described above as sensor module 320 with respect to FIG. 3. Sensor module 420 may include a die substrate 422 to which various other components may be mounted. For example, linear load detector 424 and deflection load detector 426 are required for operation as set forth herein. Detectors 424 and 426 operate as described above with regarding to linear-expansion and deflection detection. In particular, linear load detector 424 is capable of detecting linear expansion in a manner that is not sensitive to deflection, while deflection load detector 426 is sensitive to deflection and not linear expansion.

It may also be advantageous to include other sensors on sensor module 420. These additional sensors can provide additional information that may be used independent of the information collected by detectors 424 and 426, or information that may be used to further refine the processing of information collected by detectors 424 and 426. For example, sensor module 420 may also include temperature sensor 428 and/or motion sensor 430. Information from temperature sensor 428 may be utilized by processing module 440 to more accurately determine whether a user has depressed the "soft" button (as is described in more detail below with respect to FIGS. 7 and 8). Information from motion sensor 430 may also be utilized in a similar manner, such as to detect the motion and cessation of motion of user's finger on the indicia. Information from sensor module 420 can be sent to processing module 440 via interface 450, while commands and instructions can be sent from processing module 440 back to sensor module 420 via the same interface. Interface 450 can be any type of standard interface, including without limitation, one or more physical wires, PCB traces, vias on stacked circuit boards, etc. Processing module 440 can be the same processing module that controls the electronic device itself, or it can be a dedicated processor. If it is a dedicated processor, such as an image processor, it would then send user events on to a processor in the electronic device for further processing.

Figure 5A:
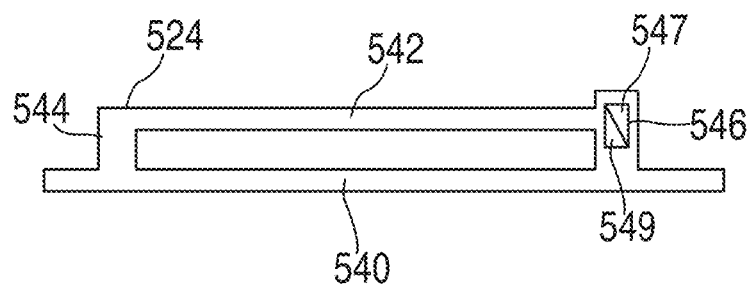
FIGS. 5A and 5B are illustrative side views of detectors constructed in accordance with at least one embodiment of the invention.
Figure 5B:
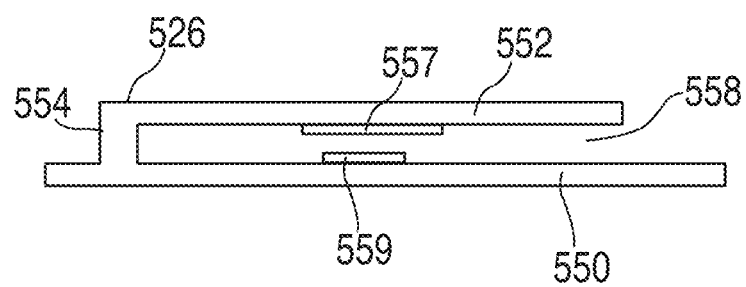

FIGS. 5A and 5B show illustrative side views of detectors that may be utilized for detectors 424 and 426 described above. In particular, FIG. 5A shows detector 524 that may be utilized for linear-load detection in instances where sensitivity to only linear loads is desired. Detector 524 includes base 540 and upper arm 542 that is substantially co-planar with base 540. Upper arm 542 is attached to base 540 at both ends. One end of upper arm 542 is attached to base 540 via left member 544, while the other end is attached to base 540 via right member 546. Embedded within right member 546 are electrodes 547 and 549 which operate to detect linear expansion (and contraction), in that the overlap between electrodes 547 and 549 changes with linear changes in detector 524. For example, positive die expansion would cause capacitance between electrodes 547 and 549 to decrease, while negative die expansion (i.e., contraction) would cause capacitance to increase. Moreover, because upper arm 542 is fixed in place with respect to base 540, detector 524 would not be sensitive to deflection changes.

FIG. 5B shows detector 526 that may be utilized for deflective-load detection in instances where sensitivity to only deflective loads is desired. Detector 526 includes base 550 and upper arm 552 that is substantially co-planar with base 550. Unlike upper arm 542, upper arm 552 is only attached to base 550 at one end via left member 554. The other end is not attached to base 550 in region 556. Detector 526 includes electrodes 557 and 559 that are coupled to upper arm 552 and base 550, respectively. Detector 526 operates to detect deflection (and contraction), in that the distance between electrodes 557 and 559 changes as upper arm 552 and base 550 are moved closer together as a result of pressure placed on the indicia described above (even if the movement is too small for the user to notice). For example, compression between base 550 and upper arm 552 would cause capacitance between electrodes 557 and 559 to increase, while the removal of pressure would increase the distance between electrodes 557 and 559 and thereby reduce capacitance. In this instance, detector 526 would have little to no sensitivity to linear expansion, at least in part, because electrodes 557 and 559 would remain in essentially the same physical relationship with respect to one another.

Figure 6A:
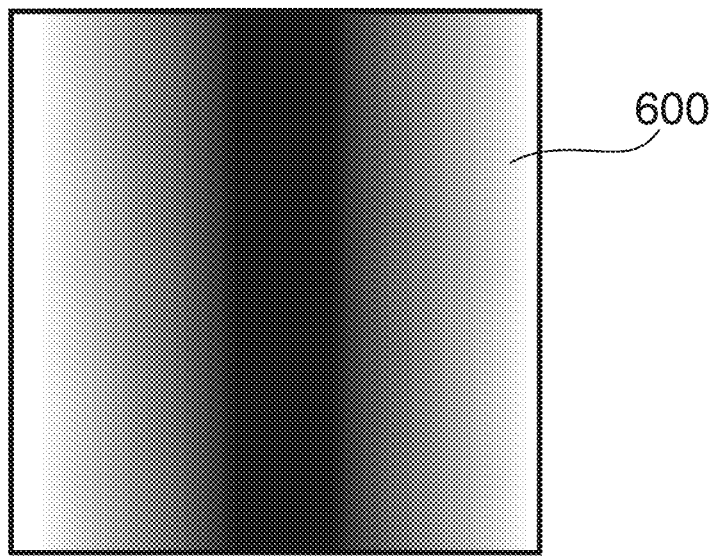
FIGS. 6A and 6B are illustrative examples of processed images that can be processed and utilized in accordance with at least one embodiment of the invention.
Figure 6B:
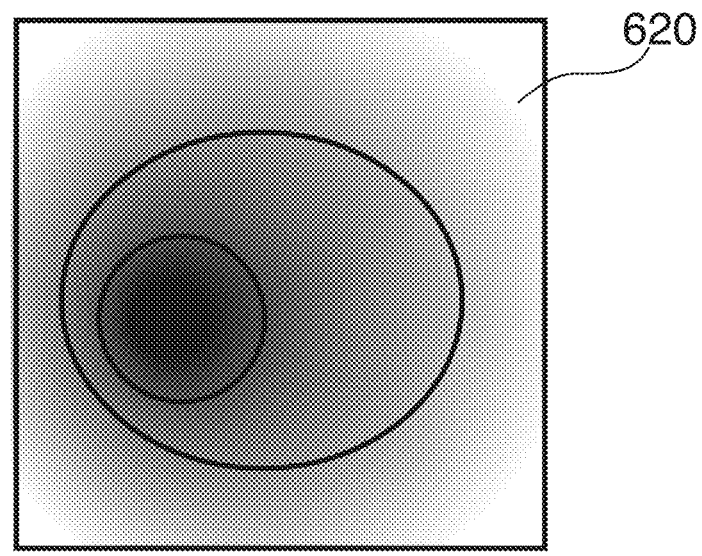

FIGS. 6A and 6B show illustrative examples of images that may be processed and utilized, as set forth in more detail below, in accordance with at least one embodiment of the invention. In particular, FIGS. 6A and 6B show sample resultant images that can be produced by utilizing one or more of the sensor modules described above. FIG. 6A, for example, shows image 600 and FIG. 6B shows image 620, each of which can be produced by processing module 340 from data collected by sensor module 320 (and sensor module 320 can collect data via detectors similar to detectors 424 and 426). Image 600 illustrates the effects of, for example, pressure being applied to the side of the substrate. As such, the image is substantially uniform and is therefore not representative of a localized finger depression by a user. Image 620, on the other hand, illustrates the effects of pressure being applied by a finger depression (see, for example, the generally round shape of the effects). In fact, image 600 may be utilized to determine the angle of incidence between the user's finger and the substrate surface.

Figure 7:
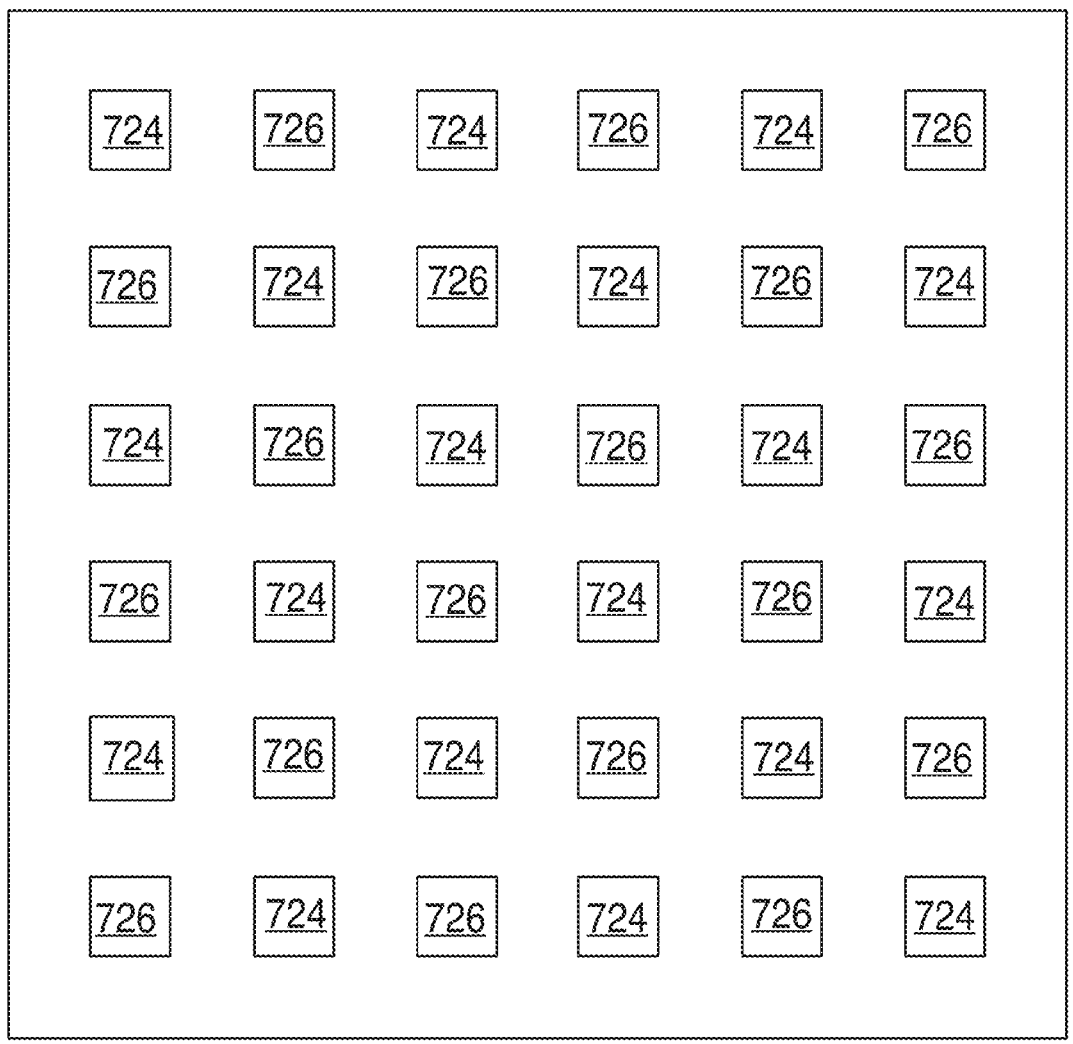
FIG. 7 shows a schematic diagram of a sensor module for collecting and processing pressure data in accordance with at least one embodiment of the invention.

FIG. 7 shows at least one embodiment of sensor module 720 for collecting and processing pressure data in accordance with at least one embodiment of the invention. Sensor module 720 can be utilized instead of or in addition to sensor module 320 and/or sensor module 420. Sensor module 720 includes multiple instances of detectors that are similar to detectors 424 and 426 described above (for purposes of illustration, the detectors labeled as 724 are functionally equivalent to detector 424, while the detectors labeled as 726 are functionally equivalent to detector 426). In the illustration shown in FIG. 7, there are total of eighteen of each type of detector, for a total of thirty-six detectors. The detectors are generally arranged in a matrix, whereby the detectors are laid out alternately by type (such that no two detectors next to each other are the same type).

The specific number of detectors, as well as the mix between detectors may vary without departing from the spirit of the present invention. In addition, the specific configuration in which the multiple detectors are laid out may also vary without departing from the spirit of the present invention. The use of multiple detectors of each type, however, provides an increased level of reliability in the determination of whether a "soft" button depression has occurred. This is, at least in part, because the use of multiple detectors of each type increases the resolution of the image that is ultimately created from the data retrieved from the detectors in a manner similar to the images shown in FIGS. 6A and 6B. Thus, the single die shown as sensor module 320 in FIG. 3 may, in fact, include multiple detectors of each type arranged in a specific configuration that increases the resolution of the created image, and thereby increases the likelihood that the processing module will correctly identify a "soft" button depression on the touch screen.

Figure 8:
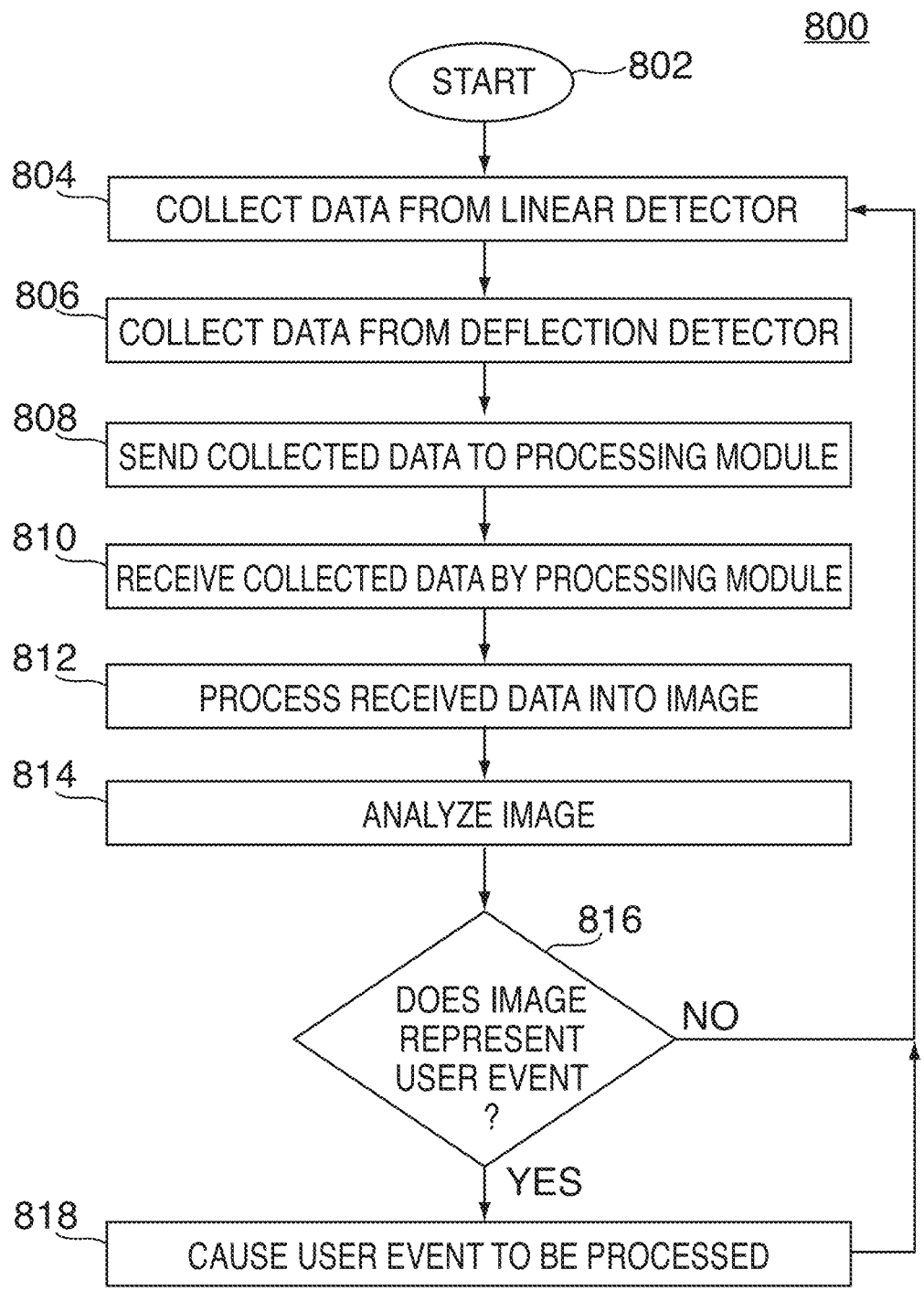
FIG. 8 shows illustrative steps for collecting and processing pressure data in accordance with at least one embodiment of the invention.

FIG. 8 shows an illustrative process 800 for collecting and processing pressure data in accordance with at least one embodiment of the invention. Process 800 can begin at step 802. At step 804, data is collected from one or more linear detectors, such as linear detector 424 described above. The data collected in step 804 should be data that is essentially representative of linear expansion (in either direction), and should not be significantly affected by inputs related to deflection. At step 806, data is collected from one or more deflection detectors, such as deflection detector 426 described above. The data collected in step 806 should be data that is essentially representative of deflection pressure (in either direction), and should not be significantly affected by inputs related to linear expansion.

At step 808, a set of collected data is sent from the sensor module (such as sensor module 420) to the processing module (such as processing module 440) via a standard type of interface. The data can be received by the processing module at step 810. At step 812, the received data can be processed into an image that is representative of the status of the substrate in the location of the indicia, such as indicia 20 described above. At step 814, the image can be analyzed in order to determine whether a user event has occurred. Step 814 can determine whether the image is similar to image 600 (see FIG. 6A), in which case no user event has occurred, or whether the processed image is similar to image 620, in which case a user event has occurred. The processing required for step 814 may be conventional image processing, but step 814 relies on the data received from both of the different type of detectors (i.e., detectors 424 and 426).

At step 816, a decision is made as to whether a user event has occurred. If no user event has occurred, the process returns to step 804 and begins collecting data from the detectors again. If a user event has indeed occurred, the process moves on to step 818, where the system causes the user event to be processed in the ordinary course. Once the user event has been addressed, the process returns to step 804 and begins collecting data from the detectors again.

Figure 9:
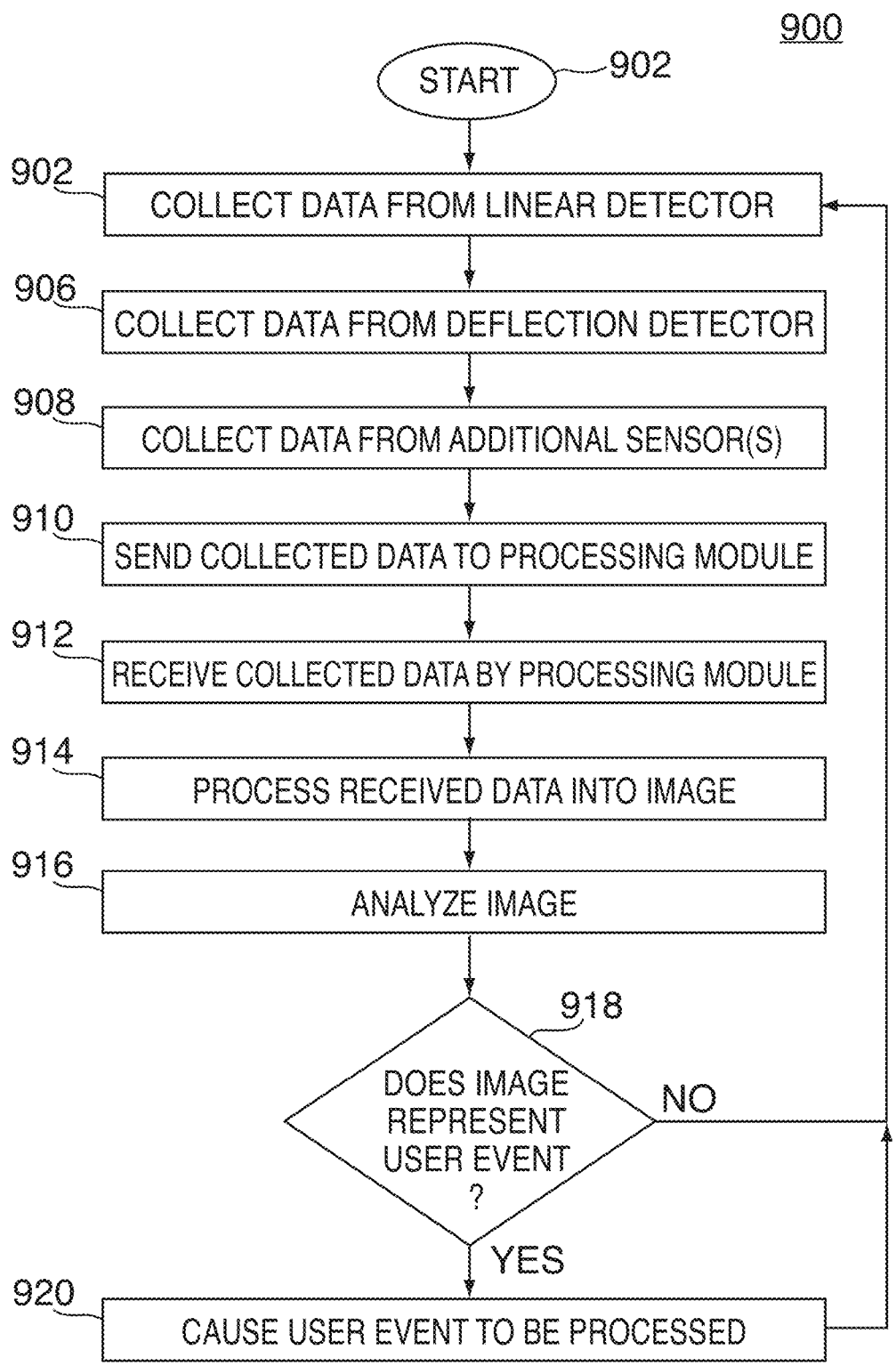
FIG. 9 shows illustrative steps for collecting and processing pressure and additional sensor data in accordance with at least one embodiment of the invention.

FIG. 9 shows an illustrative process 900 for collecting and processing pressure data and at least one other type of data in accordance with at least one embodiment of the invention. In particular, process 900 is similar to process 800 with regard to data collected from detectors, such as detectors 424 and 426, but process 900 is different than process 800 in that the processing of the data by the processing module also includes processing of additional data that is received from one or more additional sensors, such as a temperature sensor and/or a motion sensor.

Process 900 can begin at step 902. Steps 904 and 906 are essentially the same steps as described above for steps 804 and 806, respectively. At step 908, however, process 900 collects data from at least one other sensor (for simplicity, the data collection from any and all other sensors is shown as a single step even though, in reality, it may require multiple sub-steps to complete). Step 908, for example, may include collecting data from one or more temperature sensors that could measure the temperature at one or more locations on the substrate of the electronic device. Step 908, for example, may include collecting data from one or more motion sensors that can help determine whether pressure on the substrate is constant or moving, and if it is moving, to better characterize the movement (such as a finger swipe or just a bump). Once all of the data for a given data set has been collected, process 900 can continue at step 910 by sending the collected data to the processing module.

At step 912, the collected data is received by the processing module. The processing module processes the received data at step 914, including the data received from the additional sensors, into an image for analysis. The processed image is analyzed at step 916. This can result in an image match between the processed image and an image of the type shown in FIG. 6A or FIG. 6B. The process continues at step 918 where it is determined whether a user event has occurred. If a user event has not occurred, the process returns to step 904. If a user event has occurred, step 920 can cause that user event to be processed in the ordinary course of events.

It should be understood that the steps shown in FIGS. 8 and 9 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. An electronic device, comprising:
   a substrate having a top surface and a bottom surface which are co-planar, the substrate being capable of expanding linearly in any direction co-planar with the top surface and bottom surface, and also being capable of deflecting in a direction perpendicular to the to surface and bottom surface;
   sensor module mounted to the bottom surface, the sensor module comprising:
      at least one expansion detector operative to detect and collect expansion data representative of a linear expansion of the substrate, the linear expansion being independent of deflection; and
      at least one deflection detector operative to detect and collect deflection data that is representative of deflection, the deflection being independent of linear expansion; and
      a processing module operative to: receive expansion data and deflection data from the module;
      construct a first image based upon the collected expansion data;
      construct a second image based on the collected deflection data, the second image being different from the first image; and
      analyze the first image and second image to determine whether a user event has occurred.

2. The electronic device of claim 1, wherein constructing the first image and second image further comprises: reading expansion data; reading deflection data; and processing the expansion data and the deflection data into the first image and the second image.

3. The electronic device of claim 1, wherein the sensor module further comprises: a temperature sensor, and wherein the processing module uses temperature sensor data in determining whether a user event has occurred.

4. The electronic device of claim 1, wherein the sensor module further comprises a motion sensor, and wherein the processing module uses motion sensor data in determining whether a user event has occurred.

5. The electronic device of claim 1, wherein the processing module constructs the images once every predetermined time interval.

6. The electronic device of claim 1, wherein each of the at least one expansion detector reports a magnitude value.

7. The electronic device of claim 1, wherein each of the at least one deflection detector reports a magnitude value.

8. The electronic device of claim 1, wherein the at least one expansion detector includes a plurality of expansion detectors and wherein the at least one deflection detector includes a plurality of deflection detectors, and the expansion and deflection detectors are arranged in an array.

9. The electronic device of claim 8, wherein the array is a two-dimensional array.

10. The electronic device of claim 1, wherein the substrate comprises:
    a glass substrate or a metal substrate.

11. The electronic device of claim 1, wherein the substrate comprises:
    indicia indicative of the user input region.

12. A method for determining whether a user event has occurred on a substrate of an electronic device, the method comprising:
    detecting on the substrate of the electronic device using a sensor module:
       a linear expansion data, the linear expansion data representative of a linear expansion being independent of a deflection pressure;
       a deflective pressure data, the deflective pressure data representative of the deflection pressure being independent of the linear expansion;
    collecting the detected linear expansion data and the deflective pressure data;
    communicating the collected linear expansion data and deflective pressure data to a processing module;
    constructing a first image based upon the collected linear expansion data;
    constructing a second image based on the collected deflection data, the second image being different from the first image; and
    analyzing the first image and the second image to determine whether a user event has occurred.

13. The method of claim 12 further comprising: utilizing a temperature sensor to determine temperature of at least one location of the substrate; and further constructing the first image or the second image based on the determined temperature.

14. The method of claim 12 further comprising: utilizing a motion sensor to determine whether any motion has occurred on at least one location on the substrate; and further constructing the first image or the second image based on the determination made by the motion sensor.

15. The method of claim 12, wherein analyzing the first image and the second image to determine whether a user event has occurred further comprising: causing the user event to be addressed by the electronic device.

16. The method of claim 15, wherein causing the user event to be addressed by the electronic device further comprises: transmitting information related to the user event from the processing module to a processor resident within the electronic device.

* * * * *